United States Patent

Horikawa

(10) Patent No.: US 10,011,170 B2
(45) Date of Patent: *Jul. 3, 2018

(54) LID DEVICE

(71) Applicant: NIFCO INC., Yokosuka-shi, Kanagawa (JP)

(72) Inventor: Junpei Horikawa, Yokosuka (JP)

(73) Assignee: NIFCO INC., Kanagawa (JP)

( * ) Notice: Subject to any disclaimer, the term of this patent is extended or adjusted under 35 U.S.C. 154(b) by 162 days.

This patent is subject to a terminal disclaimer.

(21) Appl. No.: 15/038,786

(22) PCT Filed: Nov. 27, 2014

(86) PCT No.: PCT/JP2014/005952
§ 371 (c)(1),
(2) Date: May 24, 2016

(87) PCT Pub. No.: WO2015/083351
PCT Pub. Date: Jun. 11, 2015

(65) Prior Publication Data
US 2016/0375761 A1 Dec. 29, 2016

(30) Foreign Application Priority Data
Dec. 2, 2013 (JP) ................. 2013-249241

(51) Int. Cl.
E05C 7/06 (2006.01)
B60K 15/05 (2006.01)
(Continued)

(52) U.S. Cl.
CPC .......... B60K 15/05 (2013.01); E05B 47/0012 (2013.01); E05B 47/023 (2013.01);
(Continued)

(58) Field of Classification Search
CPC .... B60K 2015/0538; B60K 2015/0561; B60K 2015/0576; B60K 2015/0584;
(Continued)

(56) References Cited

U.S. PATENT DOCUMENTS 8,845,001 B2 * 9/2014 Kotama ............. B60L 11/1818
296/97.22
9,862,265 B2 * 1/2018 Lee ......................... B60K 15/05
(Continued)

FOREIGN PATENT DOCUMENTS

DE 102008057860 A1 7/2010
EP 1935702 A1 6/2008
(Continued)

OTHER PUBLICATIONS

International Search Report of International Application No. PCT/JP2014/005952, dated Jan. 13, 2015, 3 pages.
(Continued)

Primary Examiner — Chi Q Nguyen
(74) Attorney, Agent, or Firm — Armstrong Teasdale LLP

(57) ABSTRACT

Provided is a lid device which is compact, and can be installed in an efficient manner. The lid device (20) releasably locks a lid provided with a hinge (12) in a closed position. The lid device is provided with a push lifter that alternates between an extended state and a retracted state each time the lid is pushed, a motor (54) placed next to the push lifter, a lock member (18) and a transmission mechanism (60, 64) for transmitting the output of the motor. The push lifter and the motor are arranged such that a lengthwise direction of the push lifter and a lengthwise direction of the motor are perpendicular to each other, and such that the motor at least partly overlaps with the push lifter when seen from the lengthwise direction of the motor.

11 Claims, 4 Drawing Sheets

(51) Int. Cl.
| | |
|---|---|
| *E05B 83/34* | (2014.01) |
| *E05B 81/18* | (2014.01) |
| *E05B 47/00* | (2006.01) |
| *E05B 47/02* | (2006.01) |
| *E05B 81/06* | (2014.01) |
| *E05B 81/40* | (2014.01) |
| *E05C 19/02* | (2006.01) |
| *E05F 15/622* | (2015.01) |
| *E05B 63/00* | (2006.01) |

(52) U.S. Cl.
CPC .............. *E05B 81/06* (2013.01); *E05B 81/18* (2013.01); *E05B 81/40* (2013.01); *E05B 83/34* (2013.01); *E05C 19/022* (2013.01); *E05F 15/622* (2015.01); *B60K 2015/0538* (2013.01); *B60K 2015/0576* (2013.01); *B60K 2015/0584* (2013.01); *E05B 2047/0023* (2013.01); *E05B 2063/0026* (2013.01); *E05Y 2201/434* (2013.01); *E05Y 2201/704* (2013.01); *E05Y 2900/534* (2013.01)

(58) Field of Classification Search
CPC .......... E05B 83/34; E05B 81/18; E05B 81/06; E05B 81/40; E05B 47/0012; E05B 47/023; E05B 2047/0023; E05F 1/105; E05F 15/622; E05F 15/614; E05C 19/022; E05Y 2201/704; E05Y 2900/534; E05Y 2201/10; E05Y 2201/474

USPC ............... 49/96, 97, 22; 220/378; 296/97.22
See application file for complete search history.

(56) References Cited

U.S. PATENT DOCUMENTS

| | | | |
|---|---|---|---|
| 2010/0045049 | A1 | 2/2010 | Persiani et al. |
| 2012/0047807 | A1 | 3/2012 | Lee et al. |
| 2014/0170879 | A1* | 6/2014 | Kahara ................... B60L 1/003 439/304 |
| 2016/0251130 | A1* | 9/2016 | Horikawa ................ F16J 13/12 220/378 |
| 2016/0375762 | A1* | 12/2016 | Lee ........................ B60K 15/05 296/97.22 |
| 2017/0043660 | A1* | 2/2017 | Horikawa .............. B60K 15/05 |
| 2017/0306665 | A1* | 10/2017 | Sonobe ................... E05B 83/34 |

FOREIGN PATENT DOCUMENTS

| | | |
|---|---|---|
| JP | 2011080338 A | 4/2011 |
| JP | 2012097503 A | 5/2012 |
| KR | 101245173 B1 | 3/2013 |

OTHER PUBLICATIONS

Extended European Search Report for Application No. 14867692.7, dated Jun. 12, 2017, 6 pages.

* cited by examiner

LID DEVICE

TECHNICAL FIELD

The present invention relates to a lid device having a function to releasably lock a hinged lid in a closed position and a function to push out the lid from the closed position to a ready-to-open position, and in particular to a fuel lid device that can releasably lock a fuel lid, for selectively exposing a fuel filler opening provided on a vehicle body, in a closed position.

BACKGROUND OF THE INVENTION

A fuel lid (fuel door) is hinged to a vehicle body, and when closed, conceals the fuel filler opening and conforms to the outer profile of the vehicle body. The fuel filler opening is normally closed by a fuel cap. The fuel lid may be locked in order to avoid the fuel lid from opening inadvertently.

For instance, in a certain type of fuel lid device, the fuel lid is automatically locked when closed, and a lever provided in the cockpit of the vehicle enables the driver to release the lock and pop open the fuel lid by pulling the lever. In addition to the types of fuel lid devices that can releasably lock the fuel lid, the lid devices that can be opened and closed by pushing the lid toward the vehicle body are also known. Such fuel lids are known to be convenient for motorists who use self-service gas stations. One such example is disclosed in Patent Document 1. The disclosed device is provided with a push lifter for opening and closing the fuel lid by alternately taking the retracted position and the extended position each time the fuel lid is pushed. Additionally, an electric motor is provided such that the motor shaft extends perpendicularly to the lengthwise direction of the push lifter. The motor shaft is coaxially provided with a screw which threads into a plunger coaxially disposed with the motor shaft so that the rotation of the electric motor causes the plunger to be moved in the axial direction away from the electric motor until the free end of the plunger is received in a lock hole of the fuel lid to lock the fuel lid. When the rotation of the motor is reversed, the plunger moves in the axial direction toward the motor until the free end of the plunger is disengaged from the lock hole of the fuel lid, and the lock of the fuel lid is released.

PRIOR ART DOCUMENT(S)

Patent Document(s)

Patent Document 1: DE102008057860A

SUMMARY OF THE INVENTION

Task to be Accomplished by the Invention

According to the lid device proposed in Patent Document 1, the motor and the plunger are disposed in a coaxial relationship. Therefore, a significant space is required, and the freedom in laying out the component parts is restricted. Also, a complex assembly work is required.

The present invention was made in view of such problems of the prior art, and has a primary object to provide a highly compact lid device.

Means to Accomplish the Task

To achieve such an object, a certain aspect of the present invention provides a lid device for pushing out a hinged lid from a closed position to an open ready position, and for releasably locking the lid in the closed position, comprising: a push lifter (38) that alternates between an extended state for pushing the lid to the open ready position and a retracted state for permitting the lid to be placed in the closed position each time a free end of the push lifter is pushed by the lid; a drive unit (54) positioned near the push lifter; a lock member (18) moveable between an engage position for engaging the lid in the closed position and a release position for releasing the lid; and a transmission mechanism (60, 64) for transmitting a drive force of the drive unit to the lock member to move the lock member between the engage position and the release position; wherein the push lifter and the drive unit are arranged such that a lengthwise direction of the push lifter and a lengthwise direction of the drive unit are perpendicular to each other, and such that the drive unit at least partly overlaps with the push lifter when seen from the lengthwise direction of the drive unit.

According to this arrangement, the length of the push lifter can be minimized so that the dimension of the lid device in the direction perpendicular to both the lengthwise directions of the push lifter and the drive unit can be reduced. Thereby, the lid device can be formed as a compact unit which can be efficiently assembled. Also, the freedom in laying out the remaining component parts can be enhanced.

According to another aspect of the present invention, the lock member is configured to be moveable in parallel with the lengthwise direction of the drive unit, and to project in a reverse direction to an output end of the drive unit.

Thereby, the length of the drive unit of the lid device can be minimized.

According to yet another aspect of the present invention, the drive unit includes an electric motor (54) having a motor shaft (56) extending in the lengthwise direction of the drive unit, and the transmission mechanism includes a worm (60) coaxially attached to the motor shaft and a driven member (64) coupled with the lock member and provided with internal thread (62) meshing with the worm so as to move in parallel with the lengthwise direction of the electric motor as the worm rotates.

According to this arrangement, the rotation of the motor can be converted into a force that drives the lock member in a direction in parallel with the motor shaft by using a simple and compact structure.

According to an alternate arrangement of the present invention, the drive unit includes an actuator that is configured to reciprocate by a prescribed stroke, and the transmission mechanism includes a cam or a link.

According to this arrangement, the number of component parts of the lid device can be reduced.

According to yet another aspect of the present invention, the lid device further includes a housing (24) accommodating the push lifter, the drive unit and the transmission mechanism.

Thereby, the lid device can be formed as a module that can be assembled to a vehicle body in an efficient manner.

According to yet another aspect of the present invention, the push lifter, the drive unit and the transmission mechanism are arranged on a plane defined by the lengthwise direction of the push lifter and the lengthwise direction of the drive unit, and the push lifter and the lock member are confined within a maximum width of the drive unit in regard to a direction perpendicular to the plane.

Thereby, the width of the lid device is minimized so that the lid device can be made compact even further.

According to yet another aspect of the present invention, the housing is provided with a recess (30) for receiving an engagement piece projecting from the lid, and the lock member is configured to project into the recess to engage the engagement piece in the engage position.

Thereby, the lid is locked in a reliable manner, and is prevented from shifting in the closed position.

According to yet another aspect of the present invention, a pair of opposing walls of the recess are formed with holes (34, 36) for retaining the lock member in the engage position.

Thereby, the lock member is supported on either side of the point of engagement with the engagement piece so that the mechanical strength of the lock member can be maximized.

According to yet another aspect of the present invention, the lid device further comprises a first seal member (78) provided between a through hole (34) formed in the housing to moveably retain the lock member therein and the lock member, and/or a second seal member (52) provided between an opening (32) formed in the housing to moveably support the free end of the push lifter and the push lifter.

Thereby, a favorable sealing can be achieved between the housing and the lock member, and/or between the housing and the push lifter.

The present invention further provides a fuel lid structure (2) comprising a fuel lid pivotally supported for opening and closing a filler opening of a vehicle body and a lid device with any of the features mentioned above and configured to lock the fuel lid in the closed position.

According to this arrangement, the lid device can be formed as a compact unit which can be installed on a vehicle with the fuel lid already attached thereto in an efficient manner.

Effect of the Invention

According to the present invention, the length of the push lifter in the lid device can be minimized so that the lid device can be made highly compact, and can be installed on a vehicle in an efficient manner.

DETAILED DESCRIPTION OF THE PREFERRED EMBODIMENT(S)

Figure 1:
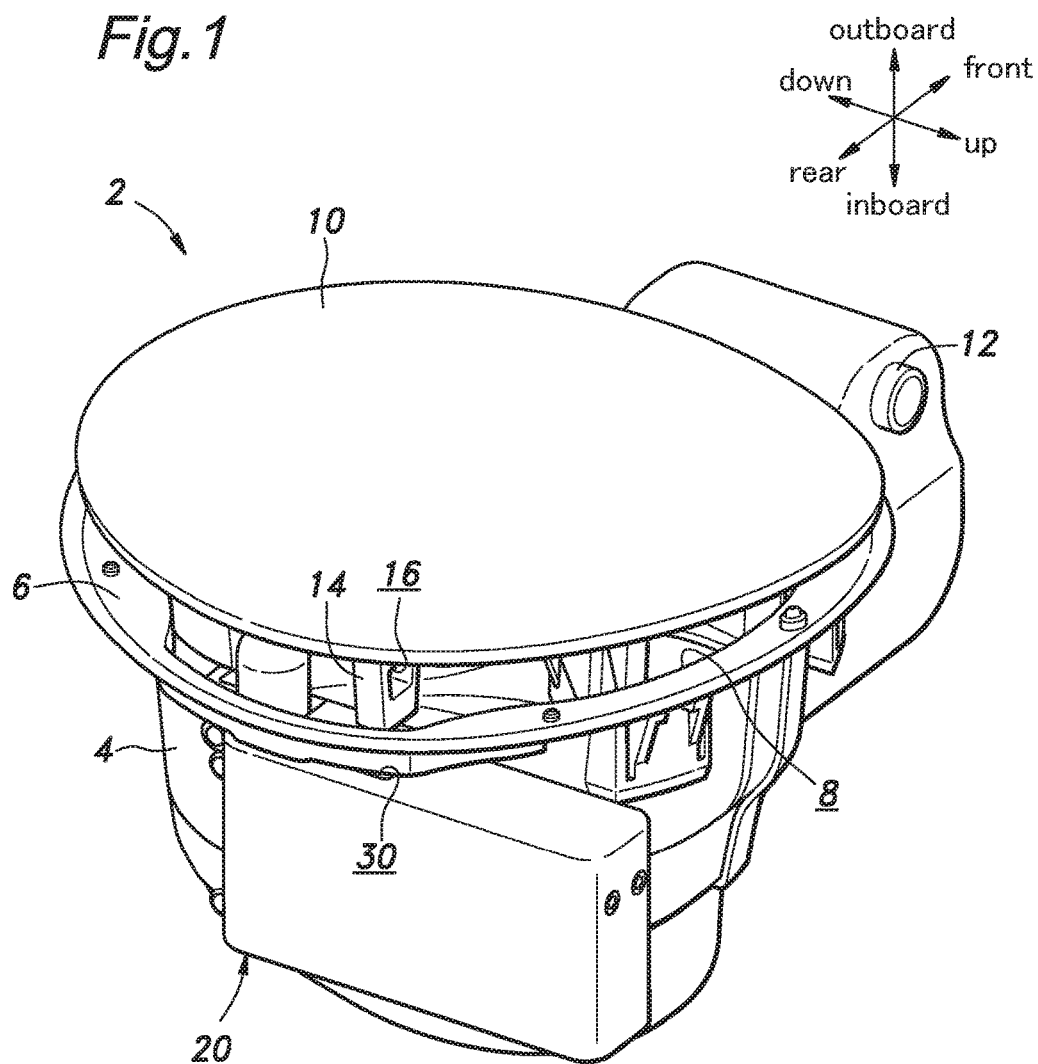
FIG. 1 is an exploded perspective view of a fuel lid assembly incorporated with a fuel lid device embodying the present invention.

The present invention is described in the following in terms of a preferred embodiment with reference to the appended drawings. The directions used in the following description are based on the orientation of the device as mounted on a vehicle. FIG. 1 is a perspective view of a fuel lid assembly 2 which is installed on a rear end part of the left side of a vehicle not shown in the drawings. However, the fuel lid assembly 2 may also be installed on the rear end, the right side or any other part of the vehicle body.

A filler opening housing 4 defining the general outer profile of the fuel lid assembly 2 is provided with the shape of a cup with an opening defined in the bottom end thereof, and the outboard end thereof having a comparatively large outer diameter is provided with a radial flange 6. When the fuel lid assembly 2 is installed on the vehicle body, the fuel filler neck communicating with a fuel tank is passed into the fuel lid assembly 2, and the open end of the fuel filter neck is closed by a cap (not shown in the drawings). A fuel lid 10 is a disk member made of metallic or plastic material, and is connected to the filler opening housing 4 via a hinge 12 so that the fuel lid 10 is enabled to open and close a fuel filler opening 8 defined on the outboard end of the filler opening housing 4. The fuel lid 10 may also be provided with a rectangular or any other planar configuration, instead of being disk-shaped. The hinge 12 is provided on the front end side of the filler opening housing 4, and is provided with a vertically extending hinge axis. The fuel lid 10 closes and opens the fuel filler opening 8 by pivoting about the hinge axial line. When the fuel lid 10 closes the fuel filler opening 8, the outer surface of the fuel lid 10 continuously conforms to the outer profile of the vehicle body. The back side of the fuel lid 10 is provided with an inner lid (not shown in the drawings) which includes an engagement piece 14 projecting from a free end part of the back side of the fuel lid 10 (remote from the base end part thereof connected to the hinge 12). An engagement hole 16 is vertically passed through the engagement piece 14. A fuel lid device 20 provided with a lock member 18 (FIG. 2) for engaging the engagement piece 14 by being passed into the engagement hole 16 is attached to an outer surface of the filler opening housing 4.

Figure 2:
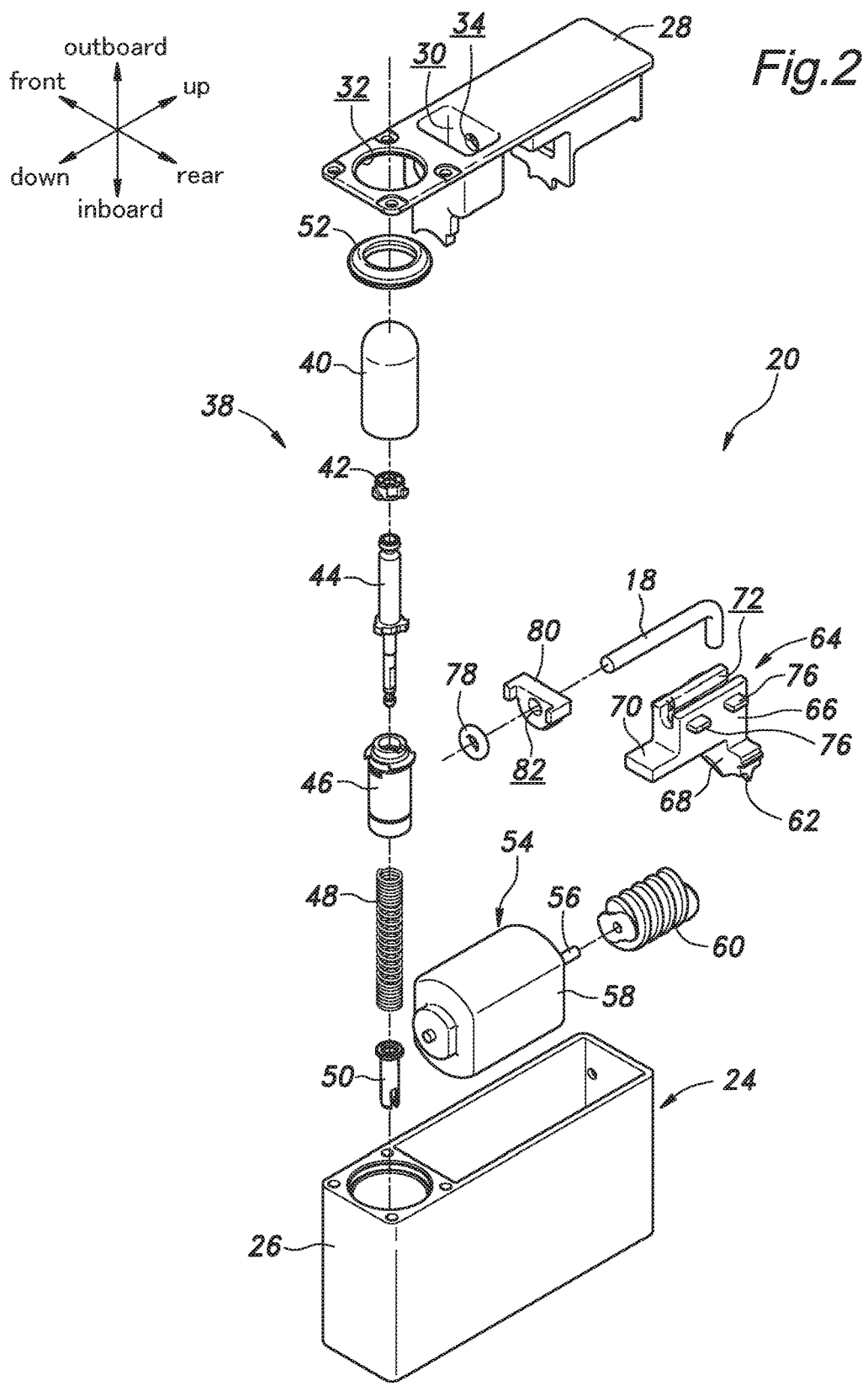
FIG. 2 is an exploded perspective view of the fuel lid device.
Figure 3:
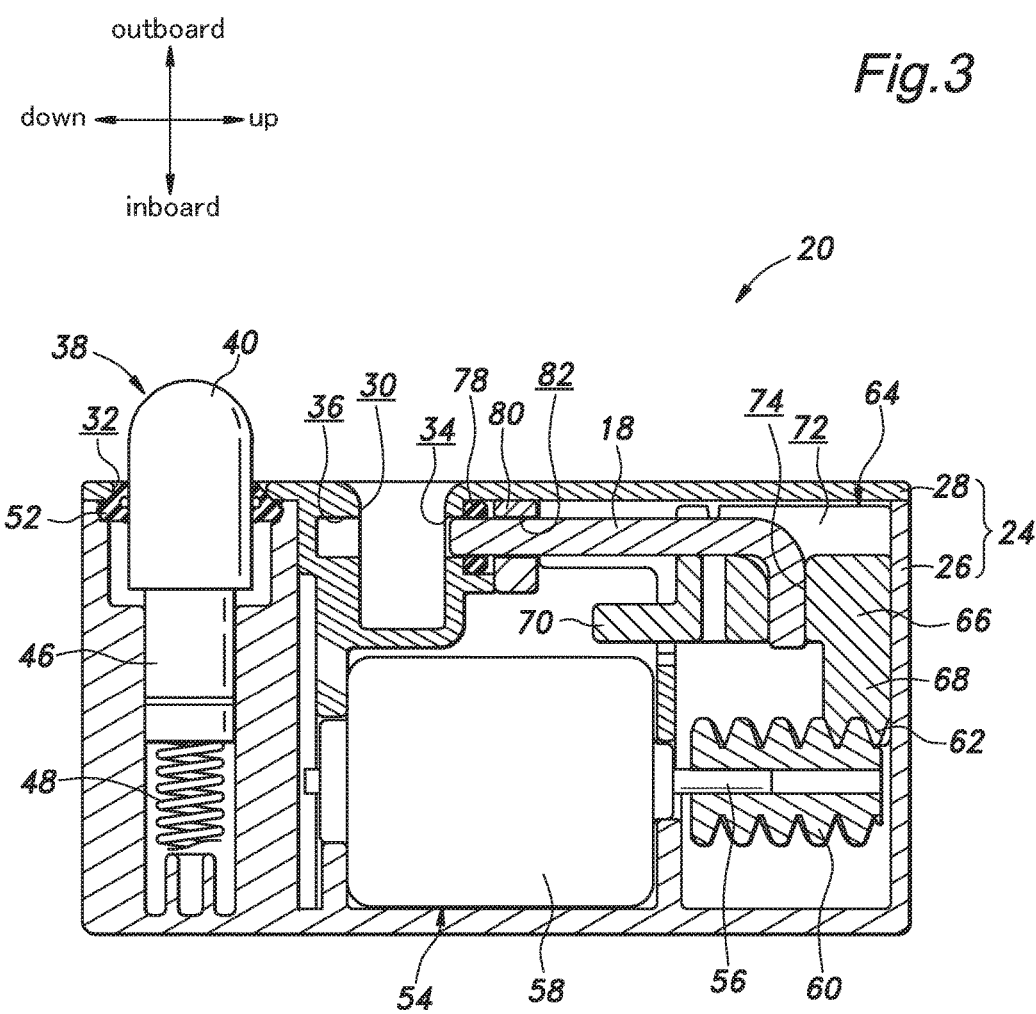
FIG. 3 is a sectional view of the fuel lid device in an unlocked state.
Figure 4:
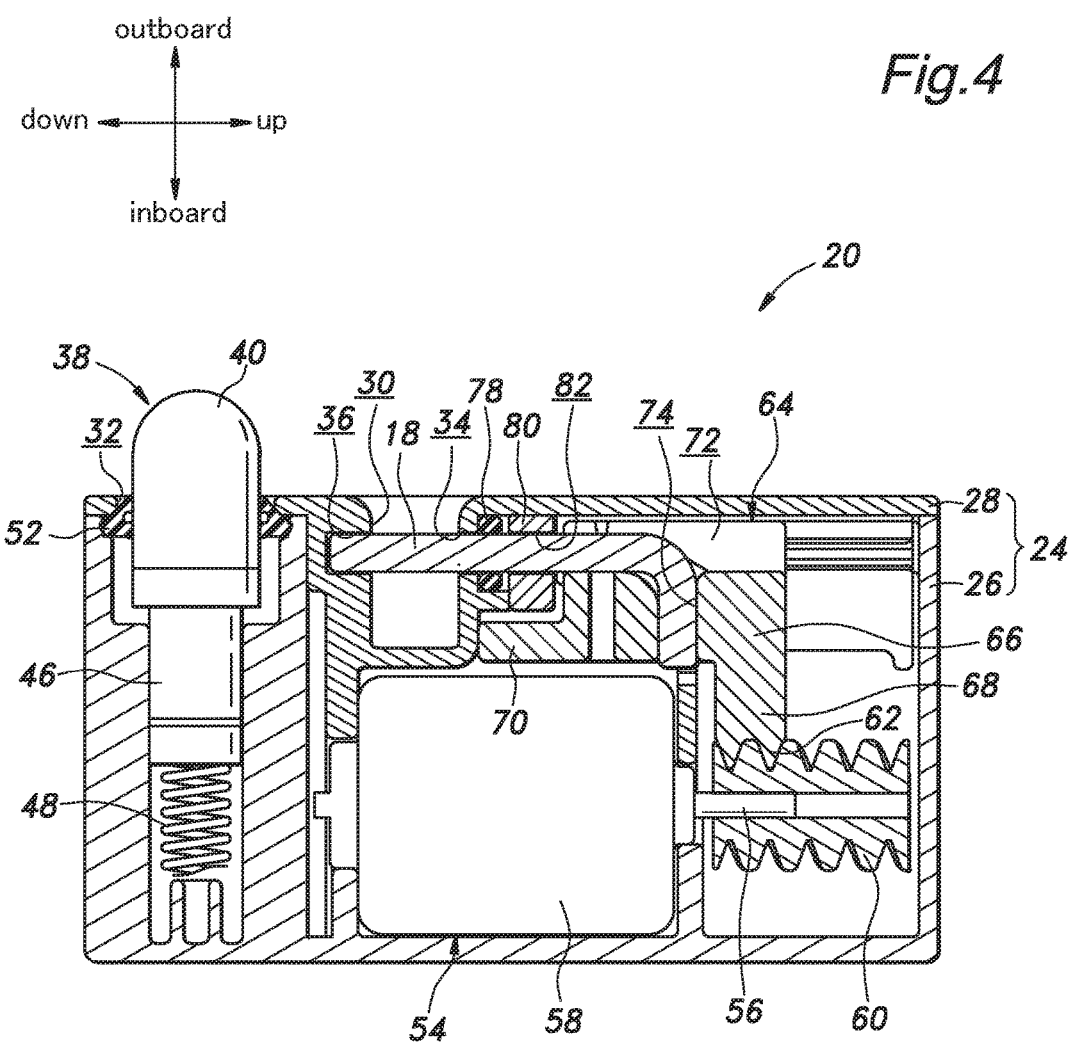
FIG. 4 is a sectional view of the fuel lid device in a locked state.

FIG. 2 is an exploded perspective view of the fuel lid device 20. FIGS. 3 and 4 are sectional views (with some part shown in side view) taken along a plane extending in the lateral and vertical direction and passing through the lock member 18, in the unlocked state and the locked state, respectively. The fuel lid device 20 is provided with the function to open and close the fuel lid 10 and the function to releasably lock the fuel lid 10 in the closed position.

The fuel lid device 20 is provided with a box-shaped housing 24 formed by a case 26 and a lid 28 for accommodating the main components of the fuel lid device 20. The lid 28 is fixedly attached to the case 26 by screws not shown in the drawings. The housing 24 is fixedly attached to the outer surface of the filler opening housing 4. The lid 28 is provided with a recess 30 for receiving the engagement piece 14 of the fuel lid 10 in the closed position thereof, and a circular opening 32 is passed through the lid 28 in the lateral direction of the vehicle body in a part rear to the recess 30. The recess 30 is recessed in the inboard direction from the outer surface of the lid 28, and is provided with a rectangular profile. The upper wall defining the recess 30 is formed with a vertically extending through hole 34, and the lower wall defining the recess 30 is formed with a blind hole 36 extending from the recess 30 in a coaxial relationship to the through hole 34 and having the same diameter as the through hole 34.

A push lifter 38 is a rod-shaped assembly received in the housing 24 for opening the fuel lid 10, and includes a push button 40, a cam 42, a rod 44, an outer sleeve 46, a spring 48 and an inner sleeve 50. Each time the push button 40 is pressed, the push lifter 38 alternates between an extended state and a retracted state. In the retracted state, the push lifter 38 does not interfere with the fuel lid 10 in the closed position, and permits the fuel lid 10 to be maintained in the closed position. In the extended state, the push lifter 38 supports the fuel lid 10 in a slightly open state. The base end of the push lifter 38 or the inboard end of the spring 48 abuts the housing 24, and the outer sleeve 46 is fixedly secured to the housing 24. The outboard end of the push button 40 is provided with a semi-spherical shape, and the inboard side thereof is provided with a cylindrical shape. The inboard end of the push button 40 is passed into the circular opening 32 formed in the lid 28, and extends through an opening provided in the flange 6 without regard to the state of the push lifter 38 (the extended state or the retracted state) so that the push button 40 may engage the fuel lid 10 at all times. Because an O ring 52 is provided on the periphery of the opening 32 as a seal member, liquid is prevented from intruding into the housing 24 even when the push button 40 slides in the opening 32 of the housing 24 in the inboard and outboard directions. The fuel lid 10 is slightly spaced from the flange 6 so that the push button 40 of the push lifter 38 may be pushed in the inboard direction even when the fuel lid 10 is in the closed position. The push lifter 38 is provided with a per se known structure, and any conventionally known push lifter may be used for the present invention. The outboard end of the push button 40 may be provided with a cushioning member. If desired, an engagement structure may be provided between the push button 40 and the fuel lid 10 so that the fuel lid 10 may be temporarily fixed in position when the push button 40 has abutted the fuel lid 10.

The structure for releasably locking the fuel lid 10 in the closed position is described in the following.

An electric motor 54 serving as a drive unit for driving the lock member 18 is placed in the housing 24 such that a motor shaft 56 thereof extends vertically and perpendicularly to the lengthwise direction of the push lifter 38. The lengthwise direction of the motor 54 is defined as the axial direction of the motor shaft 56. An upper part of the motor shaft 56 is exposed from a motor housing 58. The motor housing 58 is fixedly secured to the housing 24 such that an inboard side of the motor housing 58 is located at a substantially same height as the base end of the push lifter 38. The cross section of the motor housing 58, which is perpendicular to the motor shaft 56, is provided with an elongated shape whose long side is in parallel with the lateral direction of the vehicle body.

The motor shaft 56 is coaxially fitted with a worm 60 which is made of metallic or plastic material. A driven member 64 is supported by the housing 24 in a vertically slidable manner, and is provided with internal thread 62 that mesh with the worm 60 so that the driven member 64 moves up and down as the worm 60 rotates in corresponding directions. The driven member 64 is made of plastic material, and is provided with a main body 66 which is box-shaped and made of plastic material, a half nut portion 68 projecting in the inboard direction from the main body 66 and formed with the internal thread 62 on the inboard end thereof, and a projecting plate 70 projecting downward from the inboard side of the bottom end of the main body 66. The main body 66 is formed with a vertically extending groove 72 on the outboard side thereof, and a hole 74 extending in the inboard direction from a bottom part of the groove 72. The main body 66 is provided with two pairs of wings 76 having a major plane facing in the lateral direction of the vehicle body, and projecting from either side of the main body 66 such that each side of the main body 66 is provided with two of the wings 76, one behind the other. The wings 76 are guided by the housing 24 so that the driven member 64 may slide in the vertical direction. The upper most position of the driven member 64 is determined by the engagement of the upper end of the main body 66 and the half nut portion 68 by the housing 24. The lower most position of the driven member 64 is determined by the engagement of the lower end of the projecting plate 70 by the back side of the wall of the recess 30 through which the through hole 34 is formed. A speed reduction gear or any other kinds of gear may be interposed between the worm 60 and the half nut portion 68.

The lock member 18 fixedly attached to the driven member 64 is made of metallic or plastic material, and consists of a vertically extending rod member having an upper end bent by a 90 degree angle in the inboard direction. The lock member 18 is fixedly secured to the driven member 64 by the fact that the upper end of the lock member 18 directed in the inboard direction is fitted into the hole 74 formed in the driven member 64, and the middle part of the lock member 18 is retained in the groove 72. The lock member 18 is thus configured to move vertically jointly with the driven member 64. When the lock member 18 is at the upper most position, the free end or the lower end of the lock member 18 is received within the through hole 34. As the lock member 18 moves downward, the lower end of the lock member 18 projects from the through hole 34 into the recess 30. When the lock member is at the lower most position, the lock member 18 is received also in the blind hole 36. If desired, the lock member 18 may be integrally formed with the driven member 64 by using metallic or plastic member.

An O ring 78 is provided on the back side of the wall through which the through hole 34 communicating with the recess 30 is formed so that the lock member 18 may slide in the through hole 34 without causing liquid in the recess 30 from intruding into the housing 24 via the through hole 34. A guide member 80 for preventing the O ring 78 from coming off the housing 24 and guiding the movement of the lock member 18 is fixedly attached the housing 24. A through hole 82 is passed vertically through the guide member 80 for receiving the lock member 18 therein. The O ring 78 and the guide member 80 are located on the outboard side of the projecting plate 70.

The drive unit may consist of other actuators such as a solenoid that causes a reciprocating movement of a prescribed stroke, instead of the electric motor 54, and the transmission mechanism for the drive unit may use a cam mechanism or a link mechanism for actuating the lock member 18.

The opening and closing action of the fuel lid 10 and the operation of the lock mechanism are described in the following.

When the vehicle is in operation, the fuel lid 10 is closed, and the lock member 18 is passed into the engagement hole 16 as shown in FIG. 4. Because the lock member 18 is retained by the lid 28 via the driven member 64, and engages the engagement piece 14 received in the recess 30 between the two walls formed with the through hole 34 and the blind hole 36, respectively, the fuel lid 10 is securely held stationary against any pivoting movement. Therefore, even when the fuel lid 10 is pulled or pushed, the fuel lid 10 is locked in the closed position owing to the engagement between the engagement hole 16 and the lock member 18. There may be some play in the engagement between the engagement hole 16 and the lock member 18 but should be small enough not to cause the change of the push lifter 38 from the retracted state to the extended state even when the fuel lid 10 is pushed in the inboard direction.

The motor 54 may be linked with switches, onboard systems and an electronic control unit (ECU) of the vehicle, in particular with a door lock system, so that when the vehicle has come to a stop and the door lock is released, the motor 54 is actuated, and the motor shaft 56 is turned. The drive force of the electric motor 54 is transmitted to the driven member 64 via the worm 60, and moves the lock member 18 attached to the driven member 64 upward. As a result, the lock member 18 is released from the blind hole 36 and the engagement hole 16 in that order, and eventually moves to the release position at which the lock member 18 is completely withdrawn from the recess 30, and the free end of the lock member 18 is fully retracted into the housing 24 or the through hole 34. At this time, the upper end of the driven member 64 abuts the housing 24.

When the lock member 18 is in the released position, the lock member 18 is released from the engagement hole 16 formed in the inner lid of the fuel lid 10 so that the fuel lid 10 is freed from any restraint. The fuel lid 10 is biased by a magnetic force, a spring force or a latch mechanism so that the fuel lid 10 in the released position is held in the closed position until a force exceeding a prescribed level is applied to the fuel lid 10. At this time, if the user pushes the fuel lid 10 in the closed position in the inboard direction, the push button 40 is forced in the inboard direction. This causes the push lifter 38 to be extended so that the fuel lid 10 is pushed out in the outboard direction. As a result, the fuel lid 10 is pushed out by the push button 40 to an open ready position in which the fuel lid 10 is slightly opened so as to project slightly from the outer profile of the vehicle body. In this open ready position, the fuel lid 10 projects only to an extent necessary for the user to be able to get a hold on the free end of the fuel lid 10. The user is then enabled to manually open the fuel lid 10 to the fully open position which may be at an angle of more than 90 degrees from the fully closed position. The fully opened fuel lid 10 is maintained in this position by the magnetic force, the spring force or the latch mechanism until a force exceeding a prescribed level is applied thereto. When the fuel lid 10 is fully open, the user can refuel the vehicle by removing the fuel cap from the filler opening.

When the refueling is completed, the user puts the fuel cap back on the filler opening, and pushes the fuel lid 10 back in the inboard direction beyond the open ready position. This causes the push button 40 to be pushed in the inboard direction by the fuel lid 10, and the push lifter 38 to be put into the retracted condition. As a result, the fuel lid 10 is brought into the fully closed position. At this time, because the free end of the push button 40 which engages the fuel lid 10 is provided with a semi-spherical shape, the fuel lid 10 is prevented from being damaged.

When the vehicle doors are locked thereafter, the motor 54 is actuated as a result to cause a reverse rotation of the motor shaft 56 such that the driven member 64 is moved downward until the lower end of the projecting plate 70 of the driven member 64 abuts the back side of the wall in which the through hole 34 extending to the recess 30 is formed. As a result, the free end of the lock member 18 projects from the through hole 34, and is passed into the engagement hole 16 and the blind hole 36 in that order to lock the fuel lid 10 in the closed position.

In this fuel lid device 20, because the lengthwise direction of the push lifter 38 and the lengthwise direction of the motor 54 or the axial direction of the motor shaft are positioned on a common plane in a mutually perpendicular relationship, and the lock member 18 overlaps with the motor 54 and the worm 60 as seen in the lateral direction of the vehicle body, the fore and aft dimension and the lateral dimension of the fuel lid device 20 can be minimized. The direction from the motor 54 to the worm 60 and the direction from the driven member 64 to the free end of the lock member 18 extend in parallel to each other in opposite directions so that the vertical dimension of the fuel lid device 20 can be minimized. Because the transmission mechanism for moving the lock member 18 is formed by the worm 60 and the driven member 64 provided with the internal thread 62 meshing with the worm 60, the presence of the transmission mechanism does not prevent a compact design of the fuel lid device 20. Thus, according to the illustrated embodiment, the fuel lid device 20 is reduced in size to such an extent that the fuel lid 10 and the fuel lid device 20 may be installed on a vehicle as an integrally combined assembly or as a fuel lid assembly 2. Thereby, the efficiency of the assembly work is improved, and the manufacturing cost can be reduced.

The present invention has been described in terms of a specific embodiment, but is not limited by such an embodiment, and can be modified and substituted in various ways without departing from the spirit of the present invention. The parts of the housing 24 which slidably receive the push button 40 and the lock member 18, and the part of the housing 24 which engages the flange 6 may be at least partly formed by soft material by using a two-color injection molding process so that a sealing performance may be achieved, and the O rings 52 and 78 may be omitted. By so doing, the number of component parts and the amount of assembly work can be reduced.

GLOSSARY OF TERMS 2 fuel lid assembly
4 filler opening housing
6 flange
8 fuel filler opening
10 fuel lid
12 hinge
14 engagement piece
16 engagement hole
18 lock member
20 fuel lid device
24 housing
30 recess
32 opening
34 through hole
36 blind hole
38 push lifter
52 O ring
54 motor
60 worm
62 internal thread
64 driven member
68 half nut member
70 projecting plate
78 O ring

The invention claimed is:

1. A lid device for pushing out a hinged lid from a closed position to an open ready position, and for releasably locking the lid in the closed position, comprising:
  a spring biased push lifter that alternates between an extended state for pushing the lid to the open ready position and a retracted state for permitting the lid to be placed in the closed position each time a free end of the push lifter is pushed by the lid;
  a drive unit positioned near the push lifter;
  a lock member moveable between an engage position for engaging the lid in the closed position and a release position for releasing the lid; and a transmission mechanism for transmitting a drive force of the drive unit to the lock member to move the lock member between the engage position and the release position;

wherein the push lifter and the drive unit are arranged such that a lengthwise direction of the push lifter and a lengthwise direction of the drive unit are perpendicular to each other, and such that the drive unit at least partly overlaps with the push lifter as seen from the lengthwise direction of the drive unit.

2. The lid device according to claim 1, wherein the lock member is configured to be moveable in parallel with the lengthwise direction of the drive unit, and to project in a reverse direction to an output end of the drive unit.

3. The lid device according to claim 1, wherein the drive unit includes an electric motor having a motor shaft extending in the lengthwise direction of the drive unit, and the transmission mechanism includes a worm coaxially attached to the motor shaft and a driven member coupled with the lock member and provided with internal thread meshing with the worm so as to move in parallel with the lengthwise direction of the electric motor as the worm rotates.

4. The lid device according to claim 1, wherein the drive unit includes an actuator that is configured to reciprocate by a prescribed stroke, and the transmission mechanism includes a cam or a link.

5. The lid device according to claim 1, further including a housing accommodating the push lifter, the drive unit and the transmission mechanism.

6. The lid device according to claim 5, wherein the push lifter, the drive unit and the transmission mechanism are arranged on a plane defined by the lengthwise direction of the push lifter and the lengthwise direction of the drive unit, and the push lifter and the lock member are confined within a maximum width of the drive unit in regard to a direction perpendicular to the plane.

7. The lid device according to claim 5, wherein the housing is provided with a recess for receiving an engagement piece projecting from the lid, and the lock member is configured to project into the recess to engage the engagement piece in the engage position.

8. The lid device according to claim 7, wherein a pair of opposing walls of the recess are formed with holes for retaining the lock member in the engage position.

9. The lid device according to claim 5, further comprising a first seal member provided between the lock member a through hole formed in the housing to moveably retain the lock member therein.

10. The lid device according to claim 5, further comprising a second seal member provided between an opening formed in the housing to moveably support a free end of the push lifter and the push lifter.

11. A fuel lid structure, comprising:
a fuel lid pivotally supported for opening and closing a filler opening of a vehicle body; and
a lid device according to claim 1 configured to lock the fuel lid in the closed position.

* * * * *